United States Patent
Van Aspert

(10) Patent No.: US 9,556,996 B2
(45) Date of Patent: Jan. 31, 2017

(54) SEALING DEVICE, AIRCRAFT ENGINE PROVIDED WITH SUCH A SEALING DEVICE AND METHOD FOR PLACING SUCH A SEALING DEVICE IN AN AIRCRAFT ENGINE

(71) Applicant: Askové Kunststof Industrie B.V., Veghel (NL)

(72) Inventor: Joannes Jozef Antonius Maria Van Aspert, Berlicum (NL)

(73) Assignee: Askové Kunststof Industrie B.V., Veghel (NL)

( * ) Notice: Subject to any disclaimer, the term of this patent is extended or adjusted under 35 U.S.C. 154(b) by 400 days.

(21) Appl. No.: 14/069,928

(22) Filed: Nov. 1, 2013

(65) Prior Publication Data

US 2015/0101695 A1    Apr. 16, 2015

(30) Foreign Application Priority Data

Oct. 11, 2013 (NL) ...................... 2011588

(51) Int. Cl.
*F16L 55/11* (2006.01)
*B64D 37/00* (2006.01)
*B64F 1/00* (2006.01)
*B64F 5/00* (2006.01)
*F02C 7/22* (2006.01)

(52) U.S. Cl.
CPC .......... *F16L 55/1125* (2013.01); *B64D 37/005* (2013.01); *B64F 1/005* (2013.01); *B64F 5/0036* (2013.01); *F02C 7/22* (2013.01); *F16L 55/1141* (2013.01); *F05D 2240/55* (2013.01)

(58) Field of Classification Search
CPC ...... F16L 55/1125; F16L 55/1141; F02C 7/22; B64F 5/0036; B64F 1/005; B64D 37/005; B60K 15/0409; F05D 2240/55
USPC ........ 220/233, 234, 235, 237, 238, DIG. 33; 215/279; 138/90
See application file for complete search history.

(56) References Cited

U.S. PATENT DOCUMENTS

| | | | |
|---|---|---|---|
| 3,391,817 A | 7/1968 | Shaw | |
| 3,747,541 A * | 7/1973 | Reese | E05G 1/00 109/50 |
| 3,901,167 A * | 8/1975 | Reese | E05G 1/026 109/64 |
| 4,188,675 A * | 2/1980 | Ast | E03C 1/262 137/800 |
| 4,440,309 A * | 4/1984 | Morimoto | B65D 39/12 215/360 |
| 5,044,403 A * | 9/1991 | Chen | F16L 55/132 138/89 |
| 5,193,703 A * | 3/1993 | Staats, III | B01D 11/0203 210/198.2 |
| 5,913,441 A | 6/1999 | Voirol | |
| 6,971,534 B1 * | 12/2005 | Helms | B01D 27/00 210/184 |

FOREIGN PATENT DOCUMENTS

WO    95/30596    11/1995

* cited by examiner

*Primary Examiner* — James N Smalley
(74) *Attorney, Agent, or Firm* — Casimir Jones, SC

(57) ABSTRACT

The present invention relates to a sealing device designed for sealing a fuel inlet opening of an aircraft engine and to an aircraft engine provided with such a sealing device. The invention further relates to a method for sealing a fuel inlet opening of an aircraft engine.

14 Claims, 5 Drawing Sheets

SEALING DEVICE, AIRCRAFT ENGINE PROVIDED WITH SUCH A SEALING DEVICE AND METHOD FOR PLACING SUCH A SEALING DEVICE IN AN AIRCRAFT ENGINE

CROSS-REFERENCE TO RELATED APPLICATION

The present application claims priority to pending non-provisional Dutch Patent Application No. NL2011588, filed Oct. 11, 2013, the contents of which are incorporated by reference in its entirety.

DESCRIPTION

The present invention relates to a sealing device designed to seal a fuel inlet opening of an aircraft engine in use, the sealing device comprising a cylinder body, at least one sealing element extending on the outer circumference of the cylinder body, a control element connected to the cylinder body, which control element is provided with a handle at, or at least near, its first end remote from the cylinder body, seen in a direction of an axis of movement parallel to the cylinder axis, and which, at an opposite part thereof, is provided with a first engaging element designed for direct or indirect engagement with a transmission mechanism which, upon operation of the control element, converts an operating movement into relative movement between the control element and the cylinder body parallel to the direction of the axis of movement in order to increase an outer circumference of the at least one sealing element during at least part of the relative movement toward each other of the control element and the cylinder body and to decrease said outer circumference during at least part of the relative movement away from each other of the control element and the cylinder body. The term "aircraft engine" as used herein is understood to mean the whole of engine and housing unless explicitly indicated otherwise.

A known sealing device is used as a plug for sealing a fuel inlet opening, that is, an outflow of a fuel intake pipe into the environment, of an engine of an F16 fighter jet. When such engines are transported in dismounted condition, that is, the engine has been detached as a whole from the associated aircraft but is itself still largely in assembled condition, a considerable amount (a few litres) of fuel is often still present in the engine. In order to prevent fuel from leaking from the engine, the fuel inlet opening is sealed with the plug prior to transport of the engine. The known plug comprises two circular metal plates having a common central axis. The plates are interconnected via a threaded connection extending along the central axis, which functions as a transmission mechanism that can be rotated by means of a handle. Between the plates a cylindrical rubber sealing element extends, whose central axis likewise coincides with that of the plates and whose outer circumferential wall is slightly smaller than the interior dimension of a fuel intake pipe for which the plug has been developed. In use, the plug is introduced into the fuel intake pipe via the fuel inlet opening. Then the control element is rotated, causing the plates to move toward each other, with the sealing element being compressed therebetween. As a result, the sealing element will expand in outward direction, clamping itself in place in the fuel intake pipe.

A drawback of the known plug is that it can come loose in the fuel intake pipe due to vibrations, in particular during transport in an aircraft. When subsequently fuel leaks from the engine, a kerosene smell will spread in the aircraft. Perceiving said smell may induce a pilot to make a precautionary landing. After all, the kerosene smell could also emanate from the engine of the aircraft he is flying.

An object of the invention, according to a first aspect thereof, is therefore to provide a sealing device as described in the introduction which excludes or at least significantly reduces the risk of the sealing device coming loose from a fuel inlet opening during transport in comparison with the known plug. According to the invention, this object is achieved in that a locking device is provided, which locking device is designed to prevent or at least impede undesirable relative movement between the control element and the cylinder body in the direction away from each other. As a result, the expanded condition of the sealing device, and thus the clamping force with which the sealing device is clamped in the fuel intake pipe, is maintained, even under heavily vibrating circumstances. This characterising feature can be realised in many different ways and will be further elaborated, albeit not limitatively, hereinafter. Since movement of the sealing device relative to the fuel inlet opening is impeded or even prevented by means of the locking device, the above object of the present invention is achieved with this feature. The locking device is preferably, at least partly, provided as a part of the sealing device.

In a preferred embodiment of the present invention, the sealing element forms an integral part of the cylinder body. In this way a seal can be provided by means of one element, for example a rubber cylinder having sufficient dimensional stability for retaining the cylindrical shape upon axial compression when the wall thickness of the rubber cylinder increases.

Alternatively, the cylinder body and the sealing element are separate elements. In such an embodiment, a rubber sealing ring may extend around the cylinder body as the sealing element. The cylinder body may be provided with a widened portion at the end remote from the control element, for example a flange projecting from the outer circumference of the cylinder body. When the cylinder body is moved in the direction of the control element by means of the control element, the rubber ring will become wedged between the widened portion of the cylinder and the control element, or at least a stop which is movable relative to the control element. The rubber ring is thus compressed. Because the rubber ring is stopped by the outer wall of the cylinder body at its inner circumference, the rubber can only expand in the direction of the outer circumference of the rubber ring upon becoming wedged, causing the outer circumference of the rubber ring to increase. In other words, if the rubber sealing ring has an O-shaped cross-section in unloaded condition, the cross-section will deform to an oval shape upon application of a force as mentioned above, with the sectional dimension in the direction of the axis of movement being smaller than the sectional dimension perpendicular to the direction of the axis of movement. As a result, the sealing element will clamp down the sealing device in the fuel intake pipe.

If two or more sealing bodies arranged beside each other, seen in the direction of the axis of movement, are provided, a multiple seal, for example a double seal, can be realised therewith. This not only improves the sealing, it also provides for a continued sealing in case one of the sealing bodies becomes damaged and would not provide a reliable seal.

In a preferred embodiment of the present invention, the transmission mechanism comprises a slot that extends obliquely through the circumferential wall of the control element and a static (seen in the direction of the axis of movement) pin guided in said slot, wherein the control element moves in the direction of the axis of movement upon rotation. Thus, axial movement (along the axis of movement) of the cylinder body relative to the control element can be effected by simply rotating the control element. Depending on the angle of the slot relative to the axis of movement, said movement can be transmitted more or less gradually. Relative movement along the axis of movement can, for that matter, be realised in many different ways, which are obvious to the skilled person, by means of engaging elements.

The locking device is preferably designed to prevent or at least substantially oppose undesirable rotation of the control element. In embodiments of the present invention in which the movement of the cylinder body along the axis of movement is realised upon rotation of the control element, the locking element is capable of preventing undesirable rotation of the control element due, for example, to vibration. Such rotation, for example during transport in an aircraft, could cause the spacing between the control element and the cylinder body to increase, resulting in a decreased tension on the sealing element and thus decreased clamping force with which the sealing device is clamped in a fuel intake pipe of the aircraft engine via the at least one sealing element. The result of this would be that the sealing device can more easily become detached from the fuel inlet opening. It is preferable in that regard if the locking device can be switched between a non-locking position, for example for operation by an operator, and a locking position, for example after the sealing device has been clamped in the fuel intake pipe. Locking against rotation may be desirable also in embodiments in which the transmission mechanism does not operate on the basis of rotation, possibly as an addition to a locking engagement which opposes a transmitting movement of the transmission mechanism.

In a preferred embodiment of the present invention, the locking device comprises a locking element which, in use, mates with the aircraft engine, or at least with a part present on the aircraft engine. Said part may comprise an integral part of the aircraft engine or even comprise a specially provided connecting piece. The aircraft engine forms a static whole in use, at least in relation to the sealing device, which is quite suitable for locking the control element of the sealing device.

If the locking element is at least substantially non-rotatable relative to the cylinder body, it is not possible, at least in the case of a connection that is operated in a screw thread-like manner, to move the control element in the direction of the axis of movement relative to the cylinder body.

It is preferable in that regard if the locking element comprises teeth which, in use, engage aircraft engine teeth provided on the aircraft engine. Teeth are inexpensive and effective means for opposing relative rotation between two elements, such as a control element and the cylinder body. There are aircraft engines, for example the engine of an F-16, which comprise teeth near the fuel inlet opening, which teeth operationally cooperate with an external fuel intake pipe of a fuel source while fuel is being taken in. The design of the toothing of the sealing device can be adapted to that of the engine for which the sealing device is intended.

In a preferred embodiment of the present invention, the teeth extend away from the control element. In such an application, aircraft engine teeth may be provided which extend in opposite direction, i.e. toward the sealing device in use. If the teeth and the aircraft engine teeth can mesh, whether or not in a substantially form-locked manner, relative rotation can be prevented in an effective manner. The teeth and the aircraft engine teeth may also be designed in the form of ribs that extend parallel to the direction of the axis of movement, with ribs on the outer circumference of the sealing device engaging ribs on an inner circumference of an element of the aircraft engine, or conversely.

In unloaded condition, or at least in a condition in which the control element and the cylinder body have been moved apart, the outer circumference of the at least one sealing element ranges between 50 and 100 mm, furthermore preferably it is at least 70 mm and/or at most 80 mm.

According to a second aspect, the present invention relates to a combination of an aircraft engine provided with a fuel inlet opening and a sealing device according to the first aspect of the present invention. Such a combination is known from the example described in the introduction of an F-16 engine with a known plug. The combination according to the second aspect of the present invention solves the above-discussed problem of the sealing device unintentionally coming loose from a fuel inlet opening in a satisfactory manner.

In a preferred embodiment of the present invention, a locking element of the locking device engages the aircraft engine, or at least a locking part connected to the aircraft engine, at least substantially in a form-locked manner in use. In particular form-locked locking elements and locking parts having a shape different from a circular shape are effective in sealing devices in which a control element is to be rotated. As a matter of fact, also a circular shape is conceivable, in which case means for effecting friction are provided, for example, which oppose undesirable movement between the locking part and the locking element.

In a preferred embodiment, the locking element is provided with teeth which, in use, engage teeth on an aircraft engine.

If relatively small teeth are used, it is possible to realise relative rotation in small steps, wherein the locking element can be locked in position relative to the aircraft engine after each step.

In a preferred embodiment of the present invention, the locking element and a part of the aircraft engine that mates therewith are movable relative to each other in the direction of the axis of movement so as to effect an interlocking engagement between the locking element and the aircraft engine or release said interlocking engagement. In a condition in which the interlocking engagement has been released, an operator can thus rotate the control element, whereupon the interlocking engagement is effected so as to impede undesirable rotation, for example due to vibration, or even render it impossible.

It is preferable in that regard if a biasing device is provided, by means of which the locking element and a locking part connected to the aircraft engine are biased to an interlocking position in use. The sealing device is thus in a locked position in the fuel inlet opening of the aircraft engine at all times, unless a force is exerted, for example by an operator, against the biasing direction so as to release the locked position.

To obtain a reliable operation, it is possible to provide the locking element and the control element with corresponding indications by means of which the current position (locked/non-locked) of the sealing device is indicated. Said indication may be a text ("locked" and "non-locked") on one of the two elements and an arrow on the other element, which elements are rotated to a corresponding position relative to each other upon rotation of the control element.

According to a third aspect, the present invention relates to a method for placing a sealing device in a fuel inlet opening of a fuel intake pipe of an aircraft engine in order to prevent leakage, the method comprising the steps of:

a) placing a sealing device provided with a control element in a fuel inlet opening, and b) operating the control element so as to clamp the sealing device sealingly in the fuel intake pipe. In order to prevent, or at least impede, the sealing device from becoming unintentionally detached from the fuel inlet opening, the method further comprises the step c) of operating a locking device so as to prevent, or at least impede, undesirable movement of the cylinder body in the direction away from the control element. The problem described in the introduction and an associated solution can thus be recognized also in this third aspect of the invention.

It is preferable if the method comprises placing a sealing device according to the first aspect of the present invention in step a). The advantages of such a device have already been discussed in the foregoing.

Preferably, biasing means bias the locking device to a locking position in step c) after the locking device has been placed in a locking position. Thus, a two-stage protection against the sealing element coming loose from the fuel intake pipe is provided.

The present invention will now be explained in more detail by means of a description of a preferred embodiment of a sealing device according to the present invention with reference to the appended figures, in which.

Figure 1:
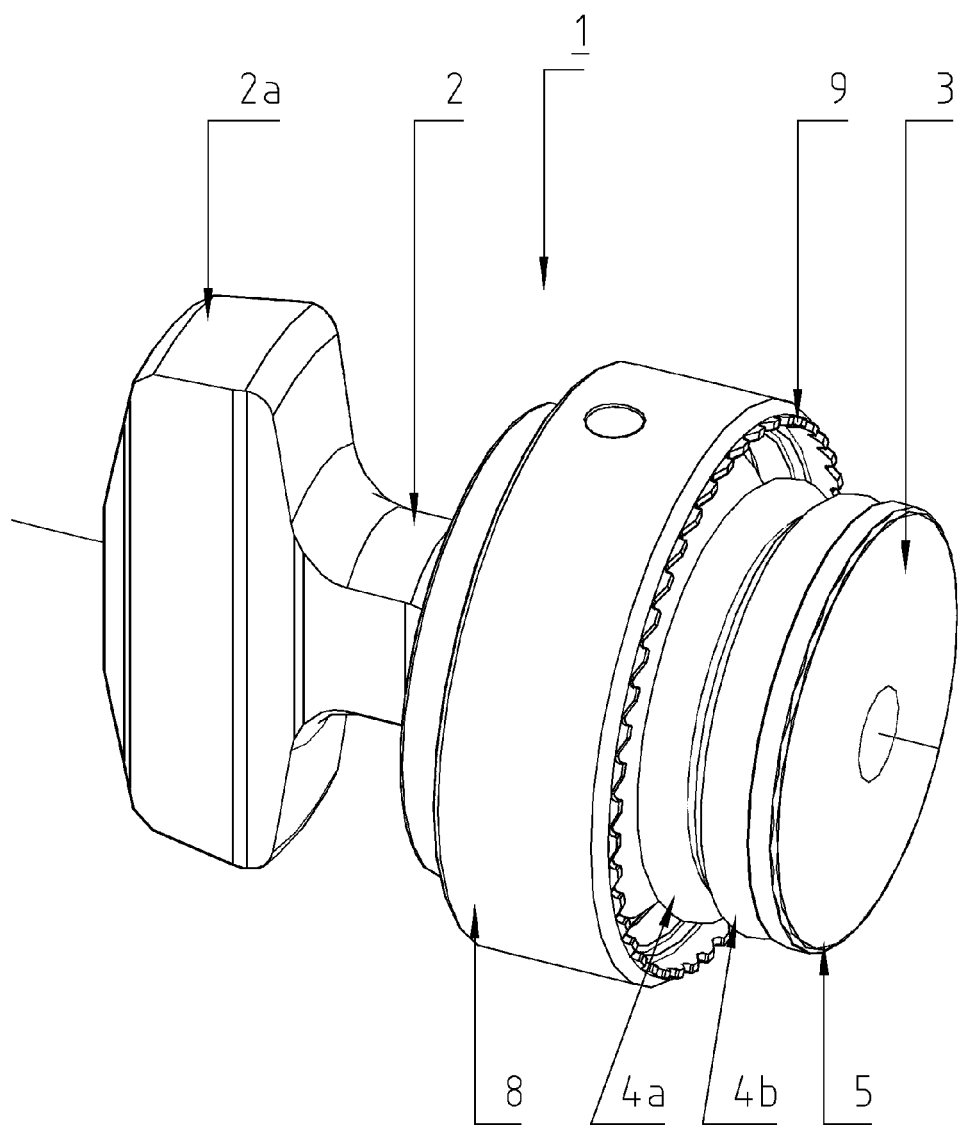
FIG. 1 is a perspective side view of a sealing device according to the present invention.
Figure 2:
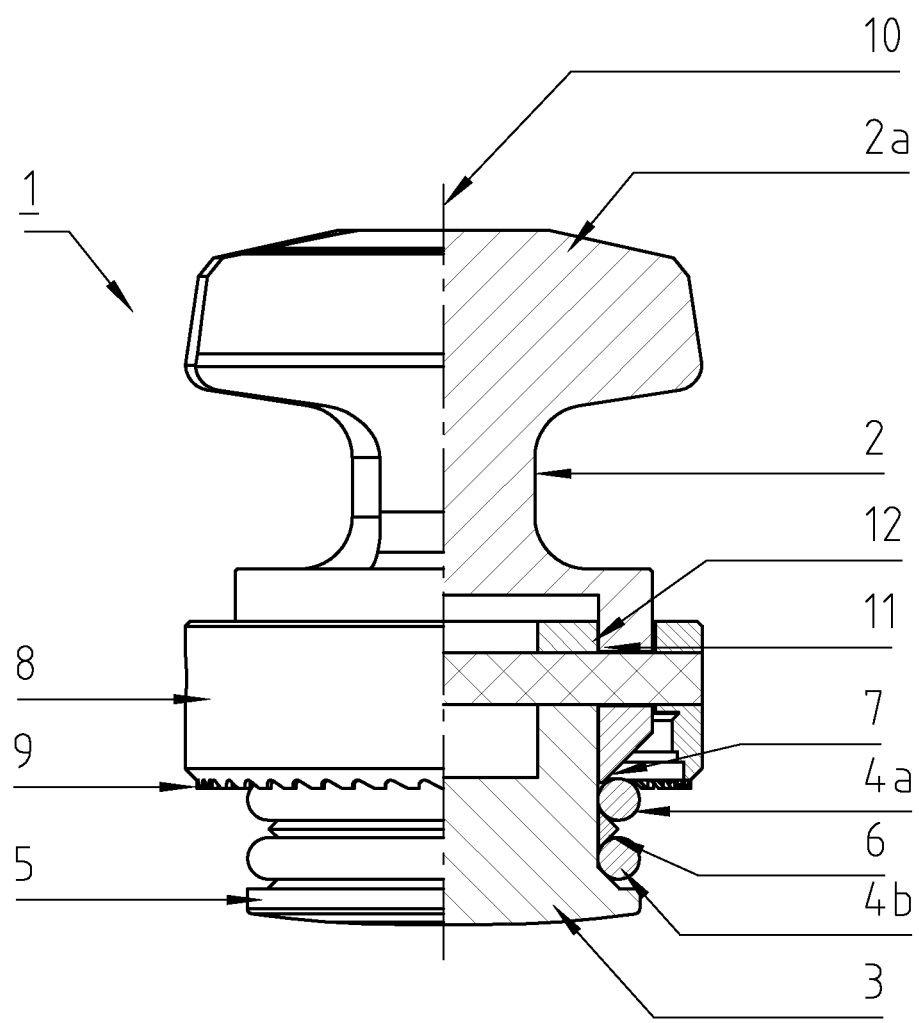
FIG. 2 is a partially cutaway side view of the sealing device of FIG. 1.

With reference now to FIGS. 1 and 2, there is shown a perspective side view of a plug 1 as the sealing device according to the present invention. The plug 1 has a control element 2 provided with a handle 2a. A cylinder 3 provided with a flange 5 is located at the end opposite the handle 2a. Two rubber sealing rings 4a, 4b surround the cylinder and 3. Located between the rings 4a, 4b is a positioning ring 6. The sealing ring 4a abuts against a stop 7 of the control element 2. A locking ring 8 extends around the cylinder 3, which locking ring is provided with teeth 9 at the end remote from the control element 2. At the location of the overlap of the locking ring 8 and the control element 2, a pin extends through holes in the locking ring 8 and a slot (not shown in the figures) provided in the control element 2 with an inclination that corresponds to that of a screw thread. The control element 2 on the one hand and the cylinder 3 and the locking ring 8 on the other hand are rotatable relative to each other about an imaginary axis of rotation that coincides with the axis of movement.

Figure 3:
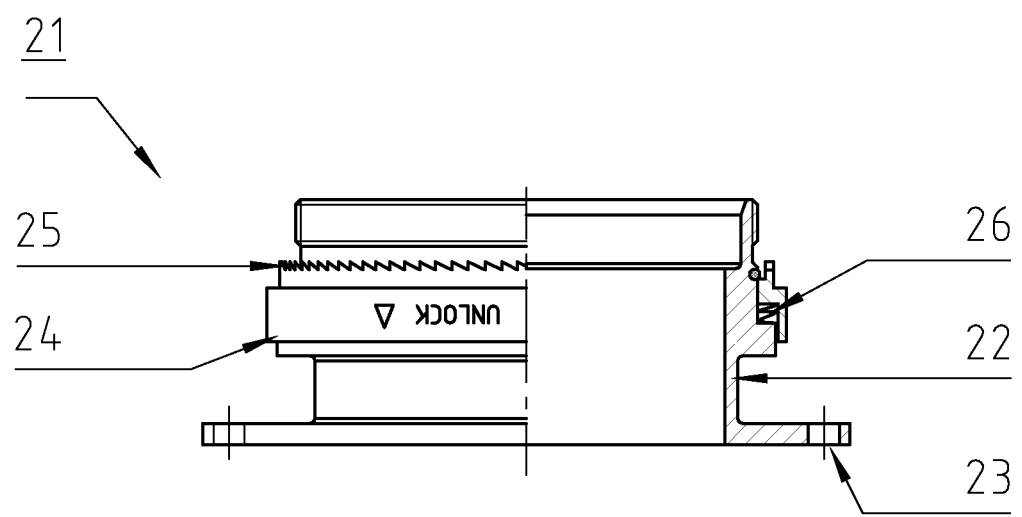
FIG. 3 is a partially cutaway side view of a connecting piece of an aircraft engine.

With reference now to FIG. 3, there is shown a connecting piece 21 forming a part of a housing of an aircraft engine (not shown). The connecting piece 21 comprises a housing 22 which is provided with through holes 23, via which the housing 22 is fixed to an aircraft engine in use. The housing may also be fixed to the engine in a different manner, it may for example be welded to the rest of the housing of an aircraft engine. The housing 22 is partially surrounded by a locking ring 24, which is provided with aircraft engine teeth 25 of an aircraft engine. A spring element 26 is biased between the housing 22 and the locking ring 24, as schematically shown in FIG. 3.

Figure 4:
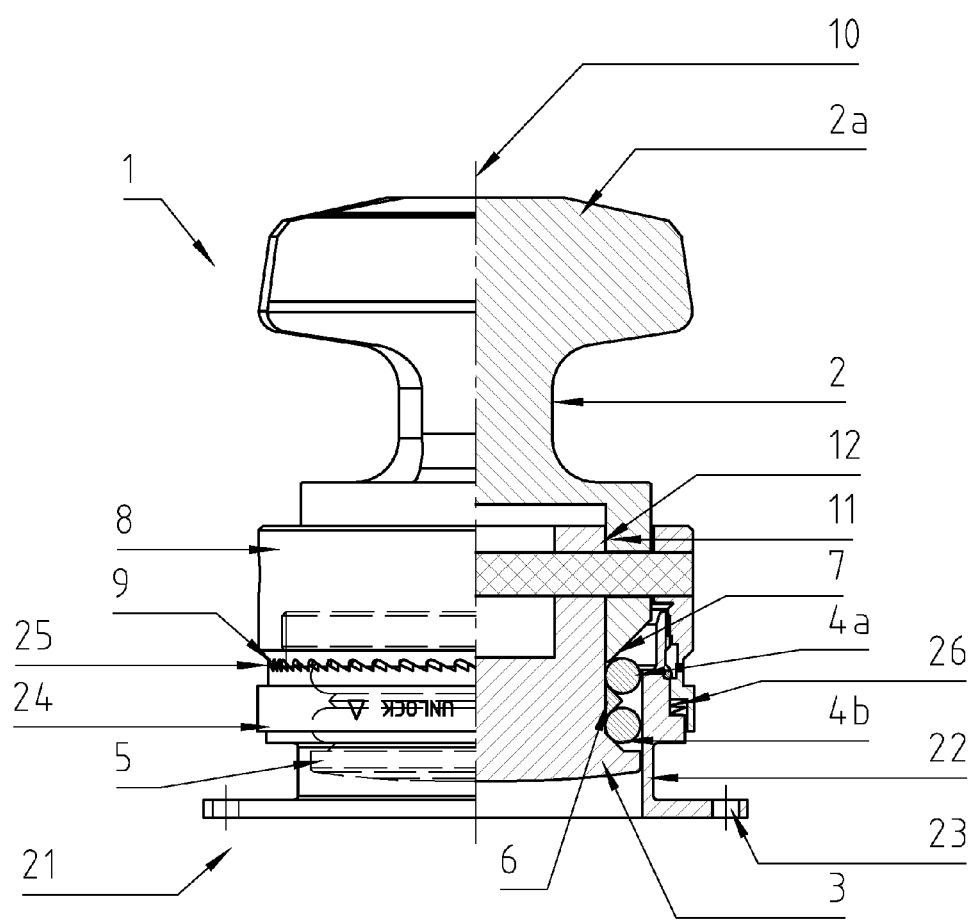
FIG. 4 is a partially cutaway cross-sectional view of the sealing device of FIGS. 1 and 2 and the connecting piece of FIG. 3 in non-sealing position.
Figure 5:
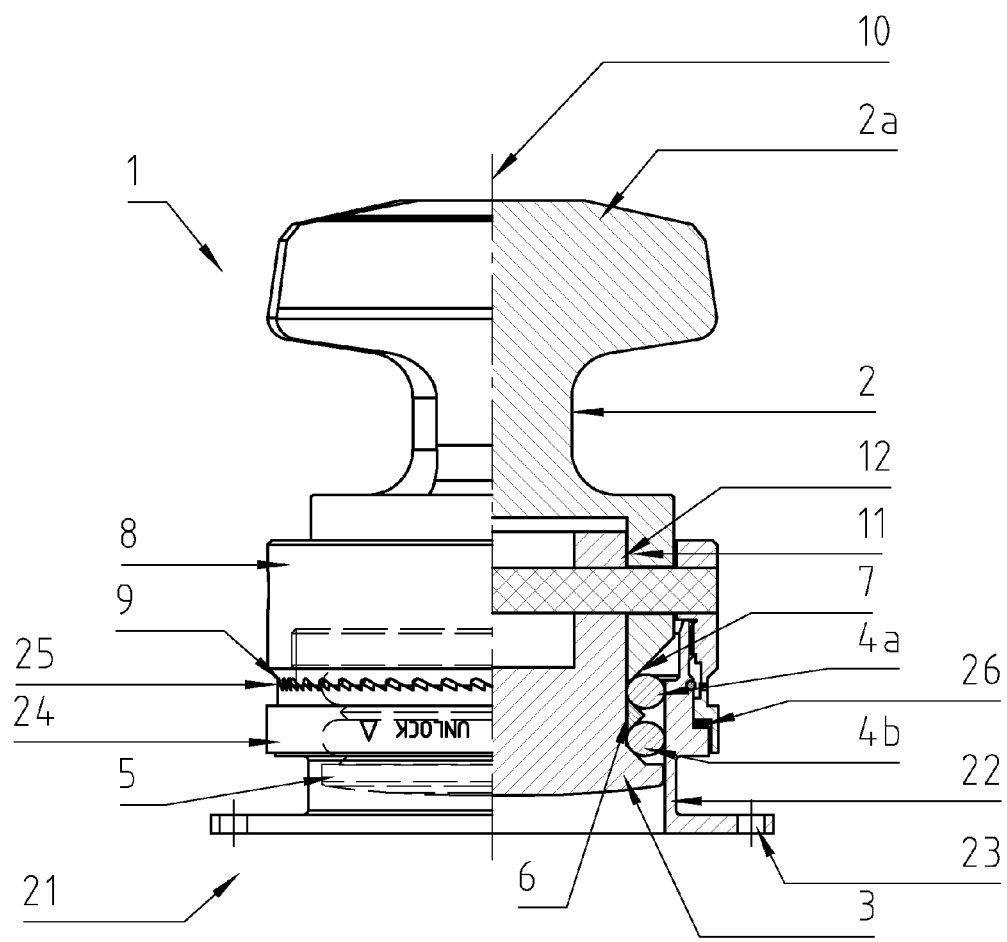
FIG. 5 is a partially cutaway cross-sectional view of the sealing device of FIGS. 1 and 2 and the connecting piece of FIG. 3 in sealing position.

With reference now to FIGS. 4 and 5, there is shown a combination of the plug 1 of FIGS. 1 and 2 and the connecting piece 21 of FIG. 3. Like parts are indicated by the same numerals as in the preceding figures in FIGS. 4 and 5. In FIG. 4, the combination is shown directly after placement of the plug 1 in the connecting piece 21. In FIG. 5 the combination is shown after the control element 2 has been rotated in clockwise direction relative to the cylinder 3.

In FIG. 4 the rubber rings 4a, 4b abut not entirely sealingly against the housing 22 of the connecting piece 21 functioning as the mouth of the fuel intake pipe of an aircraft engine (not shown in the figures). The fuel inlet opening is thus closed. In the setup shown in FIG. 4, fuel can leak from the fuel inlet opening between the sealing rings 4a, 4b and the housing 22. In this position the plug 1 cannot be easily pulled out of the fuel intake pipe or become detached therefrom, however, on account of the meshing teeth. After rotation of the control element 2 in the correct direction (usually the clockwise direction) about the axis of rotation 10, the cylinder 3 has moved inward into the control element 2 along the axis of movement 10 as a result of the cooperation between a slot that extends obliquely over the outer circumference of the control element and a static (seen in the direction of the axis of movement) pin guided in said slot functioning as a transmission mechanism. This position is shown in FIG. 5. Because the rubber rings 4a, 4b are now confined in a narrower space, they are deformed and have an oval cross-section, which ensures that the fuel inlet opening is properly sealed. The teeth 9 and the aircraft engine teeth 25 of the plug 1 and the connecting piece 21 mesh in such a manner that rotation of the control element 2 in clockwise direction relative to the locking ring 24 is possible. Rotation in anti-clockwise direction, which would cause the cylinder 3 to move further outward from the control element 2, is prevented by the teeth 9 and the aircraft engine teeth 25, however. Thus a locked, sealing position of the plug 1 relative to the connecting piece 21, and thus the fuel intake pipe, is ensured. When the plug 1 is to be removed from the connecting piece 21 of the fuel intake pipe of the aircraft engine (not shown) by an operator, the operator will pull the locking ring 24 in the direction of the axis of movement, away from the locking ring 8 of the plug 1, against the biasing spring force of the spring elements 26. Since the engagement between the teeth 9 and the aircraft engine teeth 25 is thus released, the operator can then rotate the control element 2 in anti-clockwise direction about the axis of rotation to the position shown in FIG. 4 by means of the handle 2a. The plug 1 can then be easily removed from the connecting piece 21.

In the figures and the above description only one exemplary embodiment of a sealing device according to the present invention is shown and described. It will be understood, however, that several variants, which may or may not be obvious to the skilled person, are conceivable within the scope of the present invention, which is defined in the appended claims. Thus, the transmission mechanism may comprise mechanisms other than meshing screw threads, by means of which mechanisms the cylinder is pulled more deeply into the control element so as to fix the plug more firmly in place in a fuel intake pipe of an aircraft engine. Instead of using a separate connecting piece it would be possible for integral part of a fuel intake pipe of an aircraft engine to cooperate with the plug. Furthermore, other locking mechanisms are conceivable, for example ribs that extend in the direction of the axis of movement, which ribs are provided on facing walls of the locking element. Thus, one locking element can be moved over the other locking element, with ribs preventing relative rotation of the two. The locking rings may have an unround shape, with a form-locked connection preventing relative rotation. The above are merely a few examples of variants that fall within the scope of the present invention.

The invention claimed is:

1. A sealing device designed to seal a fuel inlet opening of an aircraft engine in use, the sealing device comprising a cylinder body, at least one sealing element extending on the outer circumference of the cylinder body, a control element connected to the cylinder body, which control element is provided with a handle at its first end remote from the cylinder body, seen in a direction of an axis of movement parallel to the cylinder axis, and which, at an opposite part thereof, is provided with a first engaging element designed for direct or indirect engagement with a transmission mechanism which, upon operation of the control element, converts an operating movement into relative movement between the control element and the cylinder body parallel to the direction of the axis of movement in order to increase an outer circumference of the at least one sealing element during at least part of the relative movement toward each other of the control element and the cylinder body and to decrease said outer circumference during at least part of the relative movement away from each other of the control element and the cylinder body, wherein a locking device is provided, which locking device is designed to prevent undesirable relative movement between the control element and the cylinder body in the direction away from each other, and wherein the transmission mechanism comprises a slot that extends obliquely through the circumferential wall of the control element and a static pin guided in said slot, wherein the control element moves in the direction of the axis of movement upon rotation,
wherein two or more sealing elements arranged beside each other, seen in the direction of the axis of movement, are provided.

2. A sealing device according to claim 1, wherein the sealing element forms an integral part of the cylinder body.

3. A sealing device according to claim 1, wherein the cylinder body and the sealing element are separate elements.

4. A sealing device according to claim 1, wherein the locking device is designed to prevent oppose undesirable rotation of the control element.

5. A sealing device according to claim 1, wherein the locking device comprises a locking element which, in use, cooperates with the aircraft engine, or at least with a part present on the aircraft engine.

6. A sealing device according to claim 5, wherein the locking element is at least substantially non-rotatable relative to the cylinder body.

7. A sealing device according to claim 6, wherein the locking element comprises teeth which, in use, engage aircraft engine teeth provided on the aircraft engine.

8. A sealing device according to claim 7, wherein the teeth extend away from the control element.

9. A combination of an aircraft engine comprising a fuel inlet opening and a sealing device according to claim 1.

10. A combination according to claim 9, wherein, in use, the locking element engages the aircraft engine or at least a locking part connected to the aircraft engine.

11. A combination according to claim 9, wherein the locking element is provided with teeth which, in use, engage aircraft engine teeth provided on an aircraft engine.

12. A combination according to claim 9, wherein the locking element and a part of the aircraft engine that mates therewith are movable relative to each other in the direction of the axis of movement so as to effect an interlocking engagement between the locking element and the aircraft engine or release said interlocking engagement.

13. A combination according to claim 12, wherein a biasing device is provided, by means of which the locking element and a locking part connected to the aircraft engine are biased to an interlocking position in use.

14. A method for placing a sealing device in a fuel inlet opening of a fuel intake pipe of an aircraft engine in order to prevent leakage, comprising the steps of:
   a) placing a sealing device according to claim 1 provided with a control element in a fuel inlet opening, and
   b) operating the control element so as to clamp the sealing device sealingly in the fuel intake pipe,
   wherein the method further comprises the step c) of operating a locking device so as to prevent, or at least impede, undesirable movement of the cylinder body in the direction away from the control element, and
      wherein biasing means bias the locking device to a locking position in step
   c) after the locking device has been placed in a locking position.

* * * * *